(12) United States Patent
Bradley et al.

(10) Patent No.: US 8,403,015 B2
(45) Date of Patent: Mar. 26, 2013

(54) LAMINATING DEVICE

(75) Inventors: Samuel J. Bradley, Mundelein, IL (US); Phani Babu Giddi, Buffalo Grove, IL (US); Jesse Glen Fisher, Crystal Lake, IL (US)

(73) Assignee: ACCO Brands Corporation, Lincolnshire, IL (US)

( * ) Notice: Subject to any disclaimer, the term of this patent is extended or adjusted under 35 U.S.C. 154(b) by 360 days.

(21) Appl. No.: 12/749,589

(22) Filed: Mar. 30, 2010

(65) Prior Publication Data
US 2010/0181027 A1    Jul. 22, 2010

Related U.S. Application Data

(63) Continuation-in-part of application No. PCT/GB2009/051680, filed on Dec. 10, 2009.

(30) Foreign Application Priority Data

Dec. 11, 2008 (GB) .................................. 0822638.3

(51) Int. Cl.
*B32B 37/00* (2006.01)
(52) U.S. Cl. ........ 156/359; 156/366; 156/499; 156/555; 156/582
(58) Field of Classification Search .................. 156/359, 156/555, 580, 582, 583.1, 366, 499; 100/327, 100/160, 176
See application file for complete search history.

(56) References Cited

U.S. PATENT DOCUMENTS

| | | | |
|---|---|---|---|
| 4,302,276 A | 11/1981 | Schulze | |
| 4,387,000 A | 6/1983 | Tancredi | |
| 4,416,719 A | 11/1983 | Horiuchi | |
| 5,707,481 A | 1/1998 | Takeda et al. | |
| 5,728,257 A | 3/1998 | Lee | |
| 5,810,965 A | 9/1998 | Fwu | |
| 7,406,993 B2 | 8/2008 | Lin | |
| 7,556,077 B2 | 7/2009 | Chou | |
| 2002/0117266 A1 | 8/2002 | Han | |
| 2004/0188023 A1 | 9/2004 | Sasaki et al. | |
| 2005/0081978 A1 | 4/2005 | Britz | |
| 2005/0247405 A1 | 11/2005 | Murphy et al. | |
| 2006/0162841 A1* | 7/2006 | Hong | 156/64 |

FOREIGN PATENT DOCUMENTS

| | | |
|---|---|---|
| DE | 10056068 | 5/2002 |
| JP | 56126124 | 10/1981 |
| WO | 82/03356 | 10/1982 |

OTHER PUBLICATIONS

Invitation to Pay Additional Fees, including Partial International Search Report, for patent application PCT/GB2009/051680, Apr. 28, 2010, 5 pages.

* cited by examiner

*Primary Examiner* — James Sells
(74) *Attorney, Agent, or Firm* — Michael Best & Friedrich LLP

(57) ABSTRACT

A laminating arrangement includes a laminating roller, a heat source for heating the laminating roller, the heat source being powered by an AC power supply, and a heat source intensity control system for controlling the intensity of the heat source. The intensity control system includes a processor and a triode for alternating current communicating with the processor. The triode for alternating current is turned on and off by the processor to control the AC power supply to the heat source to vary the intensity of the heat source.

15 Claims, 8 Drawing Sheets

LAMINATING DEVICE

RELATED APPLICATIONS

This application is a continuation-in-part of International Application No. PCT/GB2009/051680 filed on Dec. 10, 2009, which claims the benefit of United Kingdom Application No. GB 0822638.3 filed Dec. 11, 2008. The entire content of the International Application is hereby incorporated by reference.

BACKGROUND

This invention relates to a laminating device, and particularly concerns a laminating device which is able to warm up to its operating temperature within a relatively short space of time.

Laminating devices are widely used for sealing items within translucent or transparent pouches, so that the items can be displayed and/or stored and remain protected from dirt, moisture and so on.

One problem with most conventional laminating machines is that, when the machine is initially switched on, it takes a relatively long time before the machine is ready to perform a laminating operation. This is because the rollers of the machine must be heated up to a high temperature. In conventional laminating machines, each roller is partially surrounded by a heavy "shoe" formed from a material such as aluminum. The shoes are heated, typically by resistance heating, and heat energy is transferred from the shoes to the rollers by radiation and convection.

While shoes of this type have proved to be effective at maintaining the rollers at the desired operating temperature, it will be appreciated that laminating machines using this technique will take a considerable length of time for the rollers to reach a suitable laminating temperature.

More recently, it has been proposed to heat the rollers by directing radiation from halogen bulbs onto the surfaces of the rollers. The heat produced by halogen bulbs is, however, intense, and it has proved difficult to heat rollers consistently and reliably in this manner. It has also been found that, if the surfaces of the rollers (which are typically formed silicone) are overheated, they may become permanently damaged, which may render the entire machine inoperable.

SUMMARY

The invention provides a laminating arrangement comprising a laminating roller, a heat source for heating the laminating roller, and a reflector positioned around the heat source for radiating energy from the heat source toward the laminating roller. The reflector includes at least one barrier extending across an open, longitudinally-extending end of the reflector to prevent a media being laminated from contacting the heat source.

The invention also includes a laminating arrangement system comprising a laminating roller, a temperature detecting arrangement operable to detect a temperature of the laminating roller, and a processor. The processor is operable to run a timer with a predetermined time period after which the laminating arrangement will timeout and shut down if no laminating has been done, to receive a signal from the temperature detecting arrangement indicative of the temperature of the laminating roller, to determine a temperature drop of the laminating roller, to compare the temperature drop of the laminating roller to a predetermined temperature drop, and to reset the timer if the temperature drop of the laminating roller is equal to or greater than the predetermined temperature drop, indicating that laminating has been done.

The invention further includes a laminating arrangement system comprising a laminating roller, a heat source for heating the laminating roller, a temperature detecting arrangement operable to detect a temperature of the laminating roller, and a processor. The processor is operable to receive a signal from the temperature detecting arrangement indicative of the temperature of the laminating roller, to determine a rate of temperature increase of the laminating roller based on the signal from the temperature detecting arrangement, to compare the determined rate of temperature increase to a nominal rate of temperature increase expected for the laminating roller, and if the determined rate is below the nominal rate, to take action to prevent damage to the laminating arrangement caused by excessive heating of the laminating roller.

The invention also includes a laminating arrangement comprising a laminating roller, a heat source for heating the laminating roller, the heat source being powered by an AC power supply, and a heat source intensity control system for controlling the intensity of the heat source. The intensity control system includes a processor and a triode for alternating current communicating with the processor. The triode for alternating current is turned on and off by the processor to control the AC power supply to the heat source to vary the intensity of the heat source.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
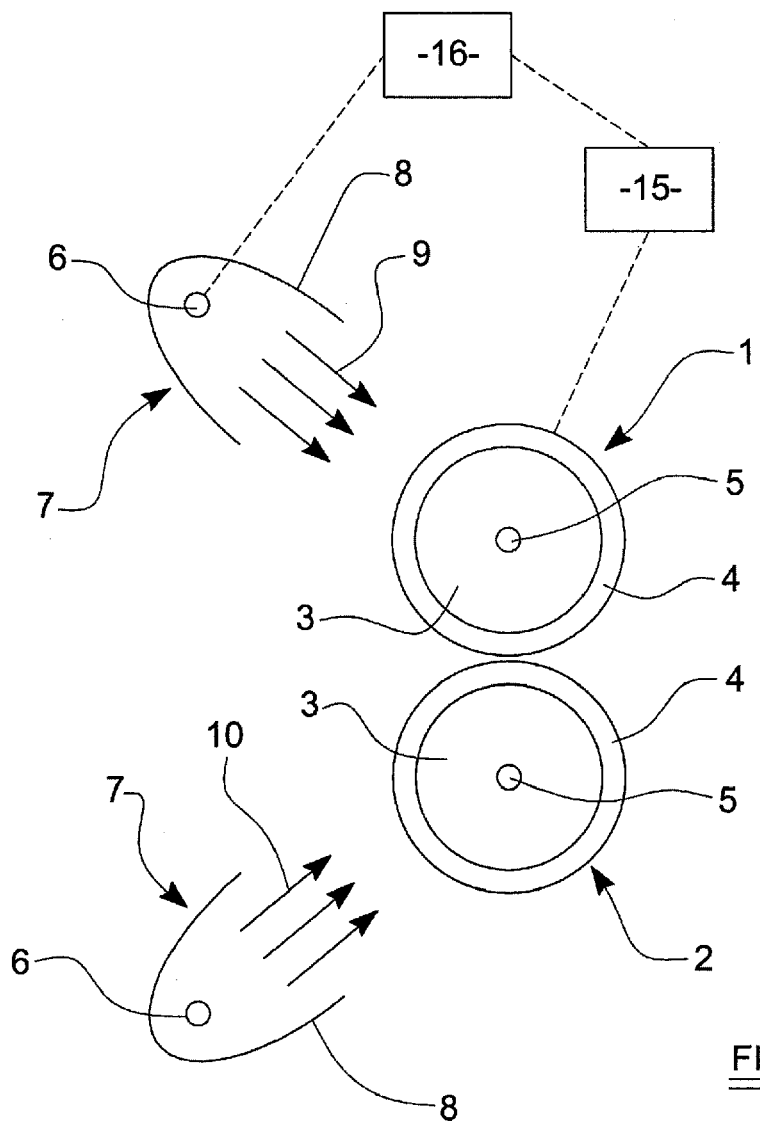
FIG. 1 is a schematic view of components of a laminating machine of the type that may be used for the present invention.

Turning firstly to FIG. 1, some of the internal components of a laminating machine embodying the present invention are shown. The laminating machine includes a pair of rollers 1,2. Each roller comprises a solid core 3, made from a material such as steel, with a relatively thin silicone covering 4 being formed around the core 3. The thickness of the silicone covering 4 with respect to the core 3 is exaggerated in FIG. 1 for the purposes of clarity.

The rollers 1,2 are parallel with one another, and are preferably biased into contact with one another by means of a spring-loaded element (not shown). The rollers 1,2 are rotatable around respective spindles 5, and may be driven to rotate in opposite directions by a gearing system (not shown) which is in turn connected to a drive motor. With reference to FIG. 1, the upper roller 1 will be driven in an anti-clockwise direction, and the lower roller 2 will be driven in a clockwise direction, so that items to be laminated may be drawn between the rollers 1,2 from left to right. Respective halogen lamps 6 are provided to radiate heat energy to the upper and lower rollers 1,2. Each halogen lamp 6 comprises an elongate halogen bulb 7. In preferred embodiments of the invention, the halogen bulbs 7 are approximately the same length as the rollers 1,2, and are arranged to be substantially parallel therewith.

A reflector 8 is provided around each halogen bulb 7. The reflectors 8 are formed from a reflective material, such as aluminum. Each reflector 8 is preferably arranged so that radiation emitted from the halogen bulb 7 is reflected from the internal surfaces of the reflector 9, and is concentrated so as to exit the reflector 8 in a particular direction. With reference to FIG. 1, the reflector 8 that is provided around the halogen bulb 7 that is provided to heat the upper roller 1 is arranged so that radiated energy is reflected to leave the reflector 8 in a direction directly towards the upper roller 1, as indicated by the arrow 9. Similarly, the reflector 8 provided around the halogen bulb 7 that is arranged to heat the lower roller 2 concentrates radiated energy and directs it towards the lower roller 2, as indicated by the arrows 10.

It will be understood that at least a part of the cross-section of each reflector 8 may be parabolic. Preferably, each reflector 8 is also elongate, is approximately the same length as the halogen bulb 7, and is arranged to be parallel with the halogen bulb 7, having a substantially consistent cross-sectional shape along its length. Each reflector 8 is therefore generally trough-shaped.

Figure 4:
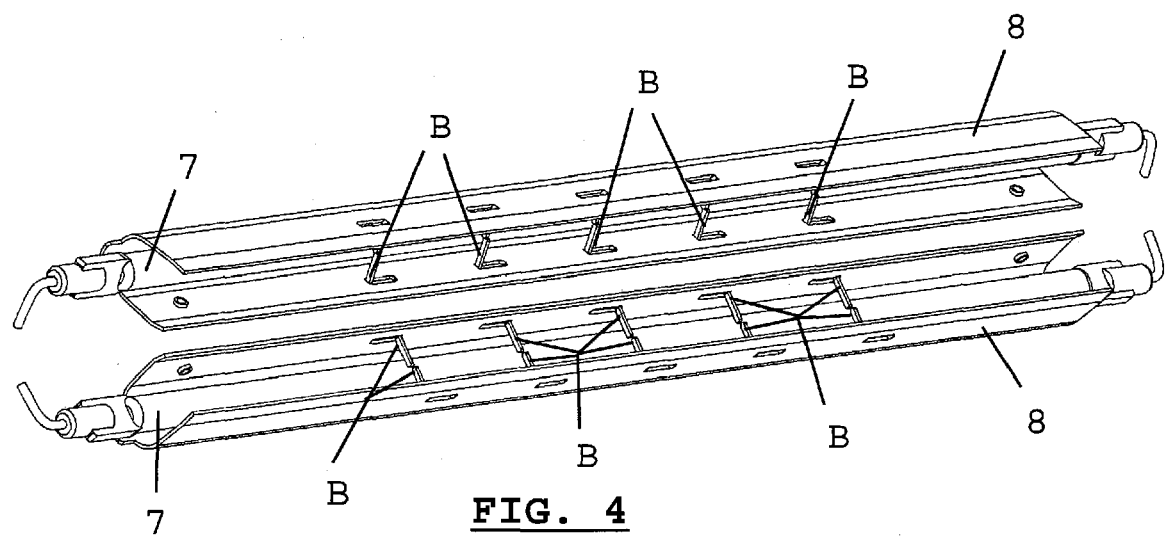
FIG. 4 is a perspective view of components of a laminating machine, including reflectors.
Figure 5:
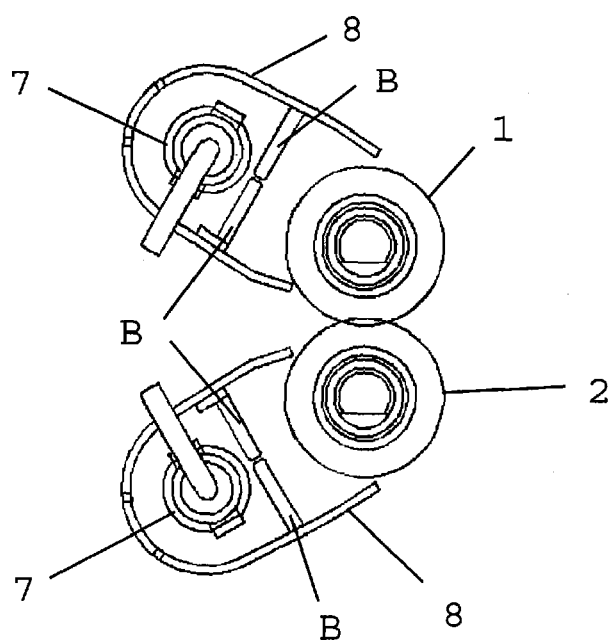
FIG. 5 is an end view of components of a laminating machine, including the reflectors of FIG. 4.

FIGS. 4 and 5 illustrate a first embodiment of the reflectors 8. In this embodiment, the reflectors 8 include a plurality of barriers B that extend across the open, longitudinally-extending end of the reflectors 8 at multiple locations along their length to prevent media being laminated from coming into contact with the halogen bulbs 7. Sometimes the media might improperly pass through the rollers 1,2 (see FIG. 5), which can be caused by the use of improper media and/or pouches, improper insertion by the user, or unintended sticking of the media to the rollers 1,2. The barriers B prevent the media from entering the reflectors 8 and contacting the halogen bulbs 7. The barriers B illustrated in FIGS. 4 and 5 are fingers formed by cutting or stamping thin slots in the reflectors 8, and then bending that cut or stamped portion of the material as shown. In the illustrated embodiment, two opposing fingers are generally aligned, with each extending about halfway across the open end of the reflector 8 to prevent passage of media further into the reflector 8. In other embodiments, single fingers could extend across the open end of the reflector 8. The number and spacing of the fingers can vary as desired.

Figure 6:
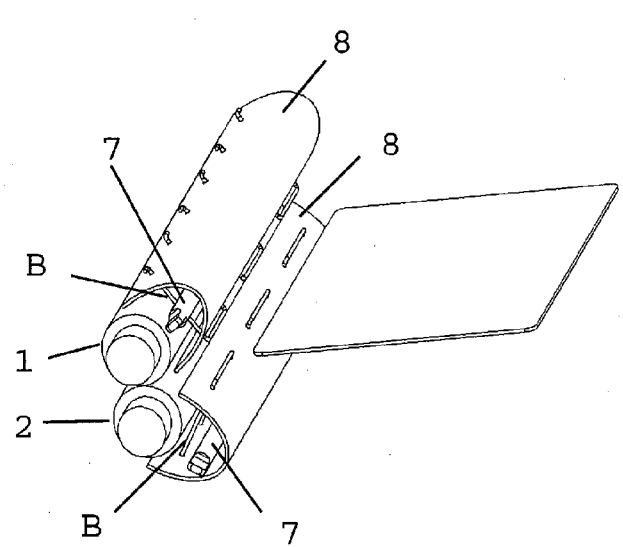
FIG. 6 is a perspective view of components of a laminating machine, including reflectors of a second embodiment.
Figure 7:
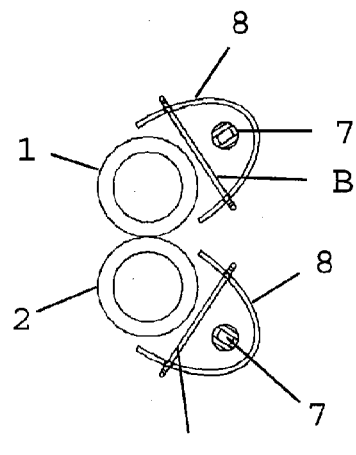
FIG. 7 is an end view of components of a laminating machine, including the reflectors of FIG. 6.
Figure 8:
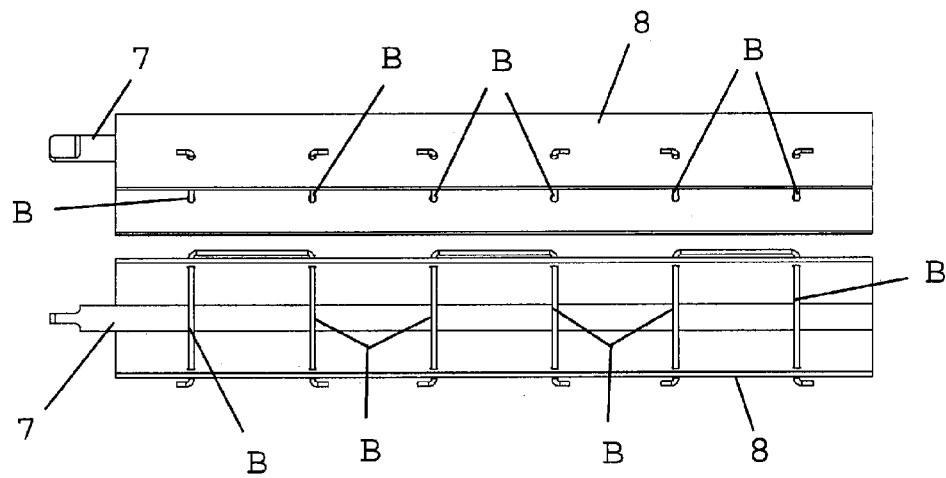
FIG. 8 is a front view of components of a laminating machine, including the reflectors of FIG. 6.

FIGS. 6-8 illustrate a second embodiment of the reflectors 8. In this embodiment, the barriers B are formed using one or more pieces of heat-resistant wire that are inserted through apertures in the reflectors 8 and extended across the open, longitudinally-extending end of the reflectors 8 as shown. The wire barriers B perform in the same manner to prevent media from coming into contact with the halogen bulbs 7. While shown as using multiple, generally U-shaped wire pieces that extend across the open end at least two times to form the barriers B, it is to be understood that a single piece of wire could be used to form all of the barriers B on one reflector 8. Alternatively, each barrier B could be formed by a separate piece of wire. The number and spacing of the wire barriers B can be varied as desired.

The width of the barriers B (i.e., the dimension of the fingers in facing relation to the halogen bulbs 7 in FIGS. 4 and 5, or the diameter of the wire in FIGS. 6-8) should be relatively small (e.g., about 2 mm or less) so that the barriers B do not substantially obstruct heat radiated from the halogen bulbs 7 from reaching the rollers 1,2. While the integrally formed finger barriers and the separate wire barriers are shown and described, those skilled in the art will understand that other structure and geometries for forming the barriers B can be substituted.

The components as illustrated in FIG. 1 are arranged to heat the rollers from ambient temperature to operational temperature in the shortest possible time. For this reason, powerful halogen bulbs 7 are provided, and the halogen bulbs 7 are provided relatively close to the surfaces of the rollers 1,2—in preferred embodiments of the invention, the distance between each bulb 7 and the respective roller is between 4 mm and 10 mm.

The halogen bulbs 7 may have power ratings up to several hundred watts. For instance, an A3-size laminating device will require a 600 w bulb in order to heat the rollers 1, 2 to the required operating temperature in less than one minute. An A4 laminating device will require a 400 w bulb to warm up in this time. These values are approximate, however.

As discussed above, if the silicone material that forms the outer surfaces 4 of the rollers 1,2 is heated above a certain temperature it may be permanently damaged. It is, therefore, important that such overheating does not occur.

The temperature of the surface of each roller 1,2 is monitored by a temperature detecting arrangement 15 (shown schematically in FIG. 1). In preferred embodiments, the temperature of the surfaces of the rollers 1,2 may be measured directly by any suitable means, for instance by one or more bimetallic strips placed at or on the surface of each roller 1,2, by a thermistor, or by a negative temperature coefficient (NTC) device associated with each roller 1,2. The output from the temperature detecting arrangement 15 is fed to a processor 16 of the laminating machine, which can be programmed to monitor for failures that might otherwise result in thermal runaway of the system, and to take action to prevent such thermal runaway conditions from occurring. This thermal runaway prevention feature will be discussed in further detail below.

The processor 16 is also operable to control the operation of the halogen bulbs 7, by varying the power supply to the halogen bulbs 7, or by turning the halogen bulbs 7 off entirely. The illustrated halogen bulbs 7 are powered by an AC power supply, which can be controlled by the processor 16 using of a triode for alternating current (TRIAC) to vary the intensity of the halogen bulbs 7. This intensity control feature will be discussed in further detail below.

The operation of the laminating machine will now be described, when the laminating machine is first switched on. The rollers 1,2 are, initially, substantially at the ambient temperature of the surroundings. The halogen bulbs 7 are switched on, and radiation from the bulbs 7 is directed towards the surfaces of the rollers 1,2.

Stored in a memory that is accessible by the processor 16 is a maximum warm-up rate for the rollers 1,2. This rate represents the fastest rate at which power, in the form of heat energy, may be delivered to the surfaces of the rollers 1,2 by halogen bulbs 7 of the type used in the laminating machine, without incurring a significant risk of damage to the surfaces of the rollers 1,2. As the surfaces of the rollers 1,2 warm up, the rate at which the temperatures of the roller surfaces increases is compared with the stored maximum warm-up rate.

If the temperature of the surfaces of the rollers 1,2 is rising more slowly than the maximum warm-up rate then the intensity of the halogen bulbs 7 may be increased, although of course if the halogen bulbs 7 are already at their maximum intensity then further increase will not be possible.

Conversely, if the temperature detecting arrangement 15 indicates that the temperature of the surfaces of the rollers 1,2 is rising at a rate which is greater than the maximum warm-up rate, the intensity of the halogen bulbs 7 may be decreased.

It will be understood that the rate at which the temperature of the surfaces of the rollers 1,2 warms up will not be entirely predictable. Factors such as the ambient temperature, manufacturing tolerances in the production of the halogen bulbs, and variations in the local power supply, will dictate that the warm-up rate cannot be determined simply by defining a pre-set intensity of the halogen bulbs 7.

Figure 2:
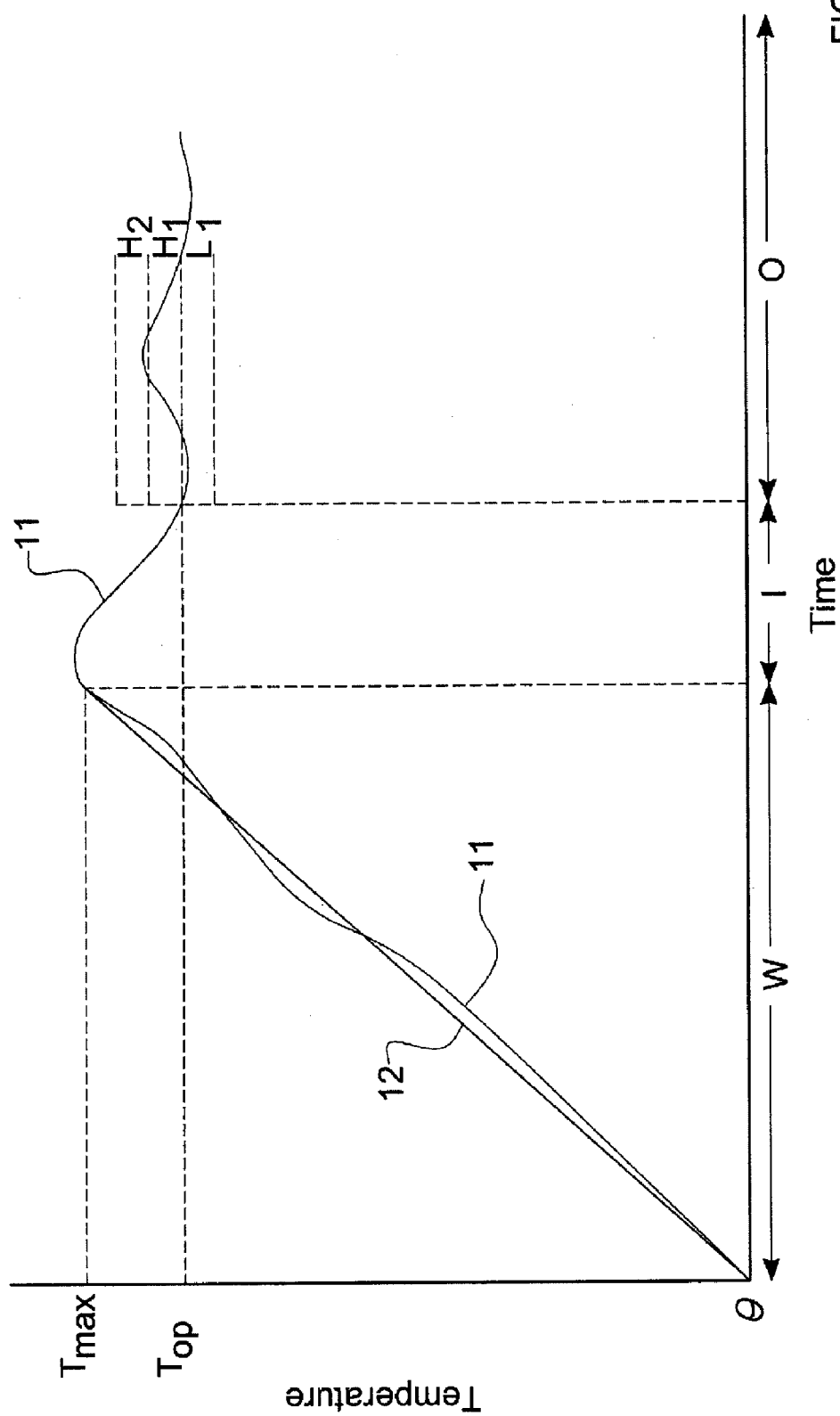
FIG. 2 shows a graph of the temperature of the surface of one of the rollers of the machine of FIG. 1 during warm up and subsequent laminating operations.

Referring to FIG. 2, a graph of temperature with respect to time is shown, following switching on of the laminating machine. During a warm-up period W, the temperature 11 of the surfaces of the rollers 1,2 rises, and is maintained as close as possible to the maximum warm-up rate 12 by the feedback arrangement described above.

A maximum temperature $T_{max}$ is defined, and when the temperature of the surfaces of rollers 1,2 reaches the maximum temperature, the warm-up phase W is complete. At this point, the laminator is ready to perform a first laminating operation, and an outward indication of this is preferably provided, for instance the switching on of a green "ready" lamp on an exterior of the laminating machine.

It is anticipated that, using the above technique, a roller may be heated to the maximum temperature $T_{max}$ within around 30 seconds. Because the rollers have been heated up in a short space of time, the majority of the heat energy that has been transferred to the rollers 1,2 will be concentrated at the very outermost portions thereof, and heat energy will not have had time to be transmitted to inner portions of the coverings 4 of the rollers 1,2. Therefore, when a first pouch to be laminated is passed between the rollers 1,2, the temperature of the rollers 1,2 will drop sharply, as the heat energy concentrated at the very outer edges of the rollers 1,2 will be transmitted to the pouch.

For this reason, the maximum temperature $T_{max}$ is considerably higher than the intended operating temperature $T_{op}$ of the laminating machine, with the intention being that, when the first pouch, or few pouches, pass between the rollers 1,2, the temperature of the rollers 1,2 will drop to the operating temperature $T_{op}$.

In preferred embodiments of the invention, the operating temperature $T_{op}$ is around 110° C. The maximum temperature $T_{max}$, however, preferably set to be around 150° C. Referring again to FIG. 2, it can be seen that in an initial use period I, the temperature falls rapidly from the maximum temperature $T_{max}$ to the operating temperature $T_{op}$.

In further embodiments of the invention, the maximum temperature $T_{max}$ is at least 25° C. higher than the operating temperature $T_{op}$. More preferably, the difference between these temperatures is at least 30° C., and still more preferably the difference between these temperatures is at least 35° C.

Following the initial use period, the laminator will enter an operation period O, in which the operating temperature of the rollers 1,2 will be maintained for subsequent laminating operations.

As discussed above, the use of powerful halogen bulbs 7 provided in close proximity to the surfaces of the rollers 1,2 will mean that large quantities of heat energy are transmitted to the rollers 1,2. If overheating of the rollers 1,2 and hence permanent damage therefore, is to be avoided, it is necessary to control the heating of the rollers 1,2 carefully.

One way in which this may be achieved is to ensure that there must be a minimum time lag between changes in the intensity of the energy supplied by the halogen bulbs 7. For instance, the circumference of each roller may be around 20 cm, and the throughput rate of the laminating device may be around 300 cm per minute. This means that each roller makes a complete revolution in approximately 4 seconds, and the processor 16 of the laminating machine may therefore be set so that, following a change in intensity of the radiation delivered by the halogen bulbs 7, and further changes in the intensity may be applied for a period of at least 4 seconds. This will help to ensure that localized "hot spots" on the surfaces of the rollers 1,2 do not occur.

In preferred embodiments, the time lag following a change of bulb intensity during which no further changes in intensity may be made is at least the time taken for one complete revolution of one of the rollers 1,2. The time lag may be set to be longer than this, but is preferably not longer than the time taken for two complete revolutions of one of the rollers 1,2.

Referring again to FIG. 3, the machine may also include one or more fans 13, which are arranged to blow air over the surfaces of the rollers 1,2, thereby cooling the surfaces. The one or more fans 13 may be activated when the temperature of the surfaces of the rollers 1,2 exceeds the target operating temperature by a predetermined amount.

It is anticipated that, in certain embodiments of the invention, the lowest intensity of radiation may be supplied by each of the halogen bulbs 7 (short of the halogen bulbs 7 being switched off) will be sufficiently high that, if there is a long gap between laminating operations, the surfaces of the rollers 1,2 may overheat. During the times between laminating operations, therefore, the fans 13 may be activated to trim excess heat from the rollers 1,2, and this may occur while the halogen bulbs 7 are still switched on.

During the operation period O of the laminating machine, feedback from the temperature detecting arrangement will preferably continue to be used to control the intensity of radiation provided by the halogen bulbs 7. In preferred embodiments, a look-up table will be used to control the bulb intensity. For instance, if the operating temperature $T_{op}$ is 110°, a first high temperature band $H_1$ may be defined between 110° and 115°. A nominal bulb intensity is defined, which is expected to maintain the surfaces of the rollers 1,2 at the operating temperature during normal operation. If the temperature of the surfaces of the rollers 1,2 is detected to be within the first high temperature band $H_1$, however, then the intensity of the bulbs 7 may be reduced by a preset amount, for instance to 70% of the nominal intensity. Preferably, a second high temperature band $H_2$ is defined between 115° or 120°, and a further reduction intensity may be defined with respect to this band. Further high temperature bands may also be defined.

Similarly, low temperature bands may be defined. A first low temperature band $H_1$ may be set to be between 105° and 110°, and if the detected temperature falls within this band $H_1$ then the intensity of the bulbs 7 may be increased to 130% of the nominal intensity.

The widths of the bands, and the bulb intensities associates with these bands, are not limited to those described above, and may be set during a calibration process to any suitable values.

It is also anticipated that the operation of the fans 13, if these fans 13 are provided, may be such that the fans 13 are activated if the detected temperature of the surfaces of the rollers 1,2 falls within the temperature bands. These temperature bands may correspond to those defined for the bulb intensity, or alternatively may be defined separately. Preferably, the fans 13 may be operated to rotate at varying rates, and it will be understood that the fans 13 may be operated to rotate at a higher rate if the detected temperature of the rollers 1,2 falls within a higher band.

In preferred embodiments of the invention, the fans 13 and other components of the laminating machine are configured so that air blown by the fans 13 is directed, after passing over the surface of one of the laminating rollers 1,2, towards an exit point of the laminating rollers 1,2. For instance, the shape of internal surfaces (not shown) of the housing 14 of the laminator may be angled so that, once air blown by the fans 13 is passed over the surface of one of the rollers 1,2, the air is deflected by this internal surfaces towards the exit point of the rollers 1,2.

Figure 3:
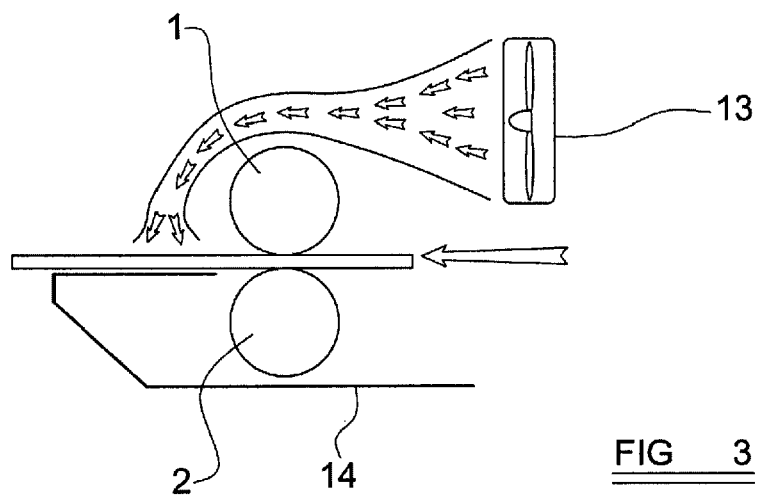
FIG. 3 is a view of further components of a laminating machine that may be used for the present invention.

A schematic view of the flow of air in these embodiments is shown in FIG. 3.

As discussed above, due to the intensity of the halogen bulb 7 it is possible that, more particularly during the first few laminating operations after the machine has switched on, laminated pouches exiting the rollers 1,2 may be heated to a very high temperature. A directing of air from the fans 13 towards the exit point of the rollers 1,2 will help to cool these pouches, which will help prevent distortion of the pouches, and also help to ensure that the pouches are at a reasonable temperature to be grasped by a user as they exit the laminating machine.

The laminating machine can include an internal timer (e.g., programmed into the processor 16) that monitors the amount of time since the last pouch was laminated. This timer runs when the laminating machine is in the operation period O. After a predetermined time has passed since the last lamination (i.e., a predetermined period of inactivity), the laminating machine will automatically timeout and shut down to minimize power draw by the system.

Figure 9:
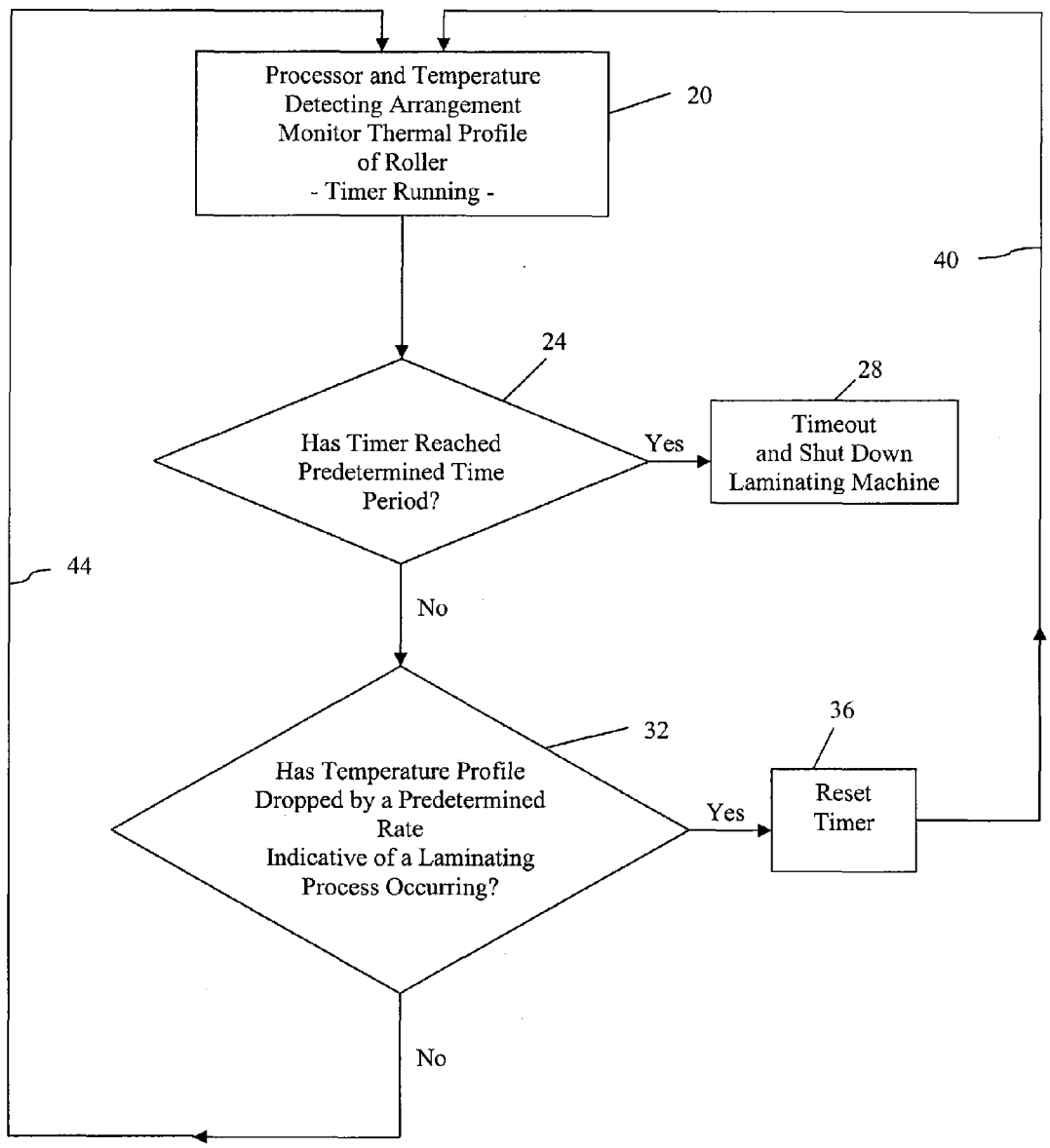
FIG. 9 is a flow diagram illustrating a timer operation of the laminating machine.

With reference to FIG. 9, and while in the operation period O as described above, the processor 16 is monitoring the temperature profiles of the rollers 1,2 based on the signals from the temperature detecting arrangement 15 (see block 20). The internal timer is running during this monitoring, and is programmed with a predetermined time period (e.g., thirty minutes) after which the laminating machine will timeout and shut down if no laminating has been done (see blocks 24 and 28). When a pouch is inserted into the laminator and passes through the rollers 1,2, the temperature profile observed at the rollers 1,2 drops (e.g., 7 to 8 degrees Celsius depending on the particular pouch and medium being laminated) due to heat transferred from the rollers 1,2 to the pouch. Comparing the actual rate of temperature drop to a predetermined rate of temperature drop at the rollers 1,2 (e.g., a drop of greater than 0.7 degrees Celsius per second), the processor 16 determines that a pouch has been laminated (see block 32). This determination triggers a reset of the timer (see block 36) so the timer starts over counting down toward the predetermined time at which the laminating machine is shut down. The monitoring then continues (as indicated by line 40 returning to block 20). If the predetermined rate of temperature drop is not observed, indicating that no pouch has been laminated, the system continues the monitoring without resetting the timer (as indicated by line 44 returning to block 20).

Using this software-based approach to reset the timer eliminates the need for physical switches (e.g., limit switches) or sensors (e.g., optical sensors) conventionally used to detect pouch insertion. Eliminating such hardware and the associated digital input/output resources for interfacing with the processor 16 reduces the cost and increases the overall robustness of the laminator. While the illustrated embodiment compares actual and predetermined rates of temperature drop, it is to be understood that comparisons of actual and predetermined temperature drops, which are not functions of time (e.g., not rates, but just magnitudes of temperature drop) are also considered to be within the scope of the invention.

The thermal runaway prevention feature of the laminating machine will now be described. Thermal runaway of a laminating system is a condition where the temperature of the rollers 1,2 or the overall system is rising continuously and unchecked due to a failure of the feedback system of the laminating machine. In conventional laminating machines, a fuse is provided, that when tripped, will cut off the power supply to the laminating machine. The fuse can be triggered based on the amount of current drawn by the electrical system (e.g., a wire fuse), or by the amount of heat present in the system (e.g., a wax fuse). The laminating machine of the present invention can include such a fuse, but with the high temperatures that can be reached in a relatively short time due to the use of the halogen bulbs 7, a failure in the feedback system that would lead to the tripping of the fuse could cause significant damage to the laminating machine.

The present invention includes a software-based method for detecting and preventing thermal runaway that will detect feedback system failures and take appropriate action (e.g., turning off the halogen bulbs 7, turning on the cooling fan 13, etc.) early enough to prevent damage to the components of the laminating machine. The processor 16 is programmed with nominal temperature profile data for the rollers 1,2, both for the warm-up period W and the operational period O.

Figure 10:
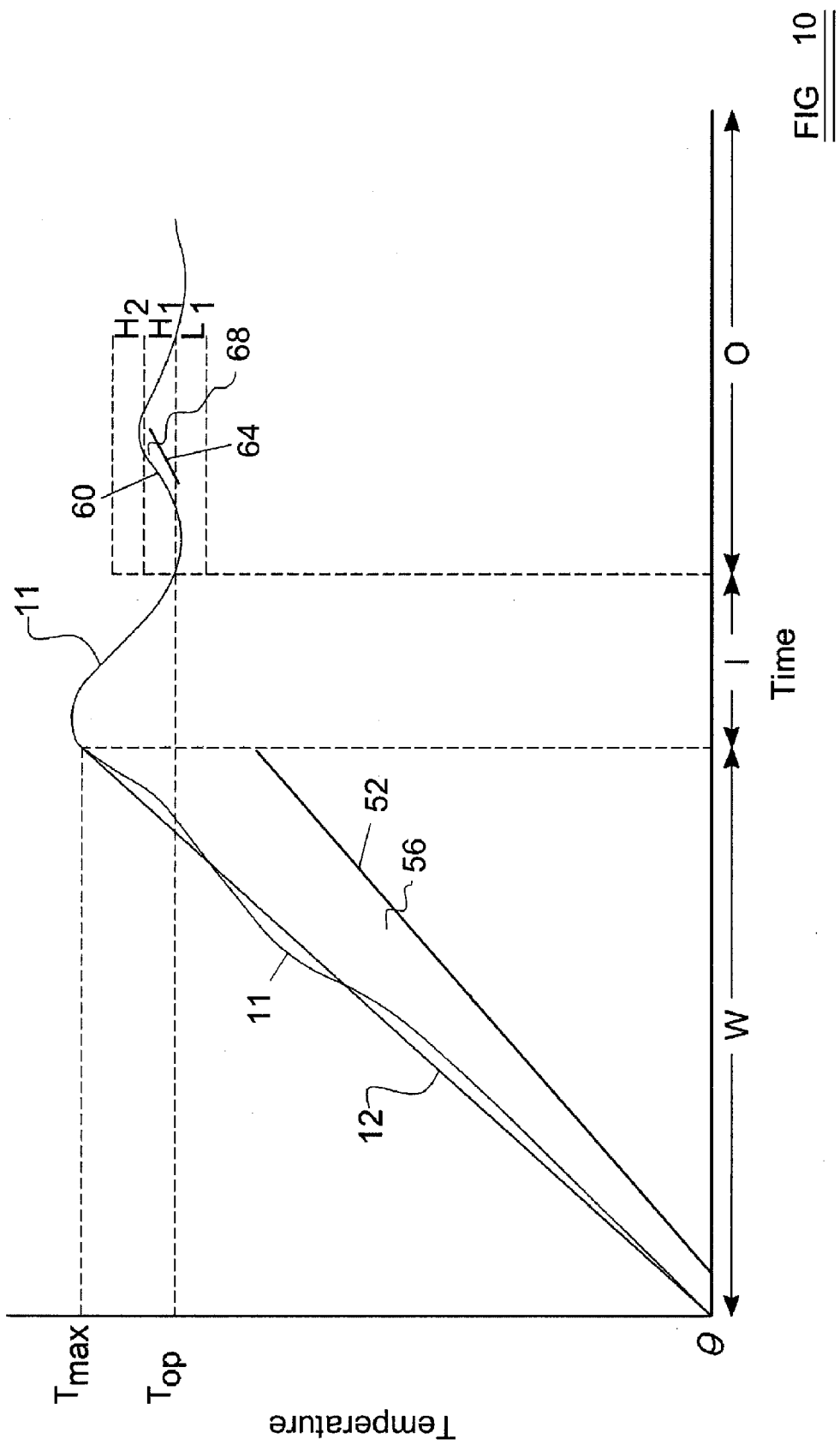
FIG. 10 shows a graph of nominal temperature rate change used by the processor of the laminating machine to monitor for thermal runaway conditions.

With reference to FIG. 10, which is similar to FIG. 2 in showing the operating periods for the laminating machine, line 12 again represents the maximum warm-up rate for the rollers 1,2 (e.g., with the intensity of the halogens lamps 7 at one hundred percent). Line 52 represents the minimum acceptable warm-up rate as programmed into the processor 16 (e.g., about 3.2 degrees Celsius every 7 seconds). Both lines 12 and 52 represent warm-up rates that are expected when the laminating machine is operating properly. They can be determined using test data from an actual machine, by mathematical modeling, or other suitable methods. The area between lines 12 and 52 represents the nominal or acceptable range 56 of warm-up rate values for the laminating machine. Any observed deviation from this nominal range on the low side (i.e., below line 52) can be attributed to a failure in the feedback system or the heat source itself, which results in terminating the current action and notifying the user. Any deviation from this nominal range 56 on the high side (i.e., above line 12) is acceptable as system feedback should result in downward adjustment (e.g., by reducing the intensity of the halogen bulbs 7) to return to the nominal range 56.

With respect to the warm-up period W and after an initial start-up interval (e.g., about ten to twenty seconds), the processor 16 begins the sampling process, comparing the actual warm-up rate to the nominal range 56. If the observed warm-up rate is below the expected nominal range 56 there is a failure in the feedback system, since it is known that the warm-up rate should fall in the nominal range 56. Some types of failures that could result in the observed warm-up rate being below the nominal range 56 and that could be harmful to the laminating machine if unchecked can include a stoppage of the rollers 1,2, (which can be caused by a motor failure or a roller jam) or a failure of the temperature detecting arrangement 15. Failure of the halogen lamps 7 will also obviously result in a warm-up rate lower than the nominal range 56, but will not result in heat damage to the rollers 1,2.

If the rollers 1,2 stop rolling while the halogen bulbs 7 are working properly, the observed rate of temperate increase will be below nominal since the temperature detecting arrangement 15 is measuring a location on the roller 1,2 generally spaced from the direct radiation path of the halogen lamps 7. A lower than nominal temperature increase will be observed because the measured location on the roller 1,2 is not receiving the proper amount of heat from the halogen lamps 7 due to the roller 1,2 not turning properly. If the rollers 1,2 are not turning properly, excessive heat exposure to the portions of the roller 1,2 facing the halogen lamps 7 could damage the rollers 1,2. Therefore, the processor 16 will shut down the halogen lamps 7. The fan 13 can also be activated to facilitate cooling of the rollers 1,2. An error signal in the form of a visual indicator (e.g., lights and/or an error message) and/or an audio indicator (e.g., beeping) can be provided so the user understands that something is wrong.

Likewise, if the rollers 1,2 are properly turning and the halogen bulbs 7 are working properly, but the temperature detecting arrangement 15 fails, the measured temperature change observed will be lower than the nominal range 56. The processor 16 will again be able to shut down the halogen lamps 7, activate the fan 13, and/or keep the rollers 1,2, turning to facilitate cooling before any excessive overheating of the rollers 1,2 can occur. An error signal in the form of a visual indicator (e.g., lights and/or an error message) and/or an audio indicator (e.g., beeping) can be provided so the user understands that something is wrong.

The thermal runaway prevention system can also include a maximum time-to-warm-up timer programmed into the processor 16. Should the warm-up phase W reach a predetermined time (e.g., about two minutes and twenty seconds for the illustrated laminating machine, but can vary for other machines) by which the system does not observe that the rollers 1,2 have reached the maximum temperature $T_{max}$, then the processor 16 can shut down the halogen bulbs 7, activate the fan 13, and keep the rollers 1,2 turning to prevent system damage. An error signal in the form of a visual indicator (e.g., lights and/or an error message) and/or an audio indicator (e.g., beeping) can be provided so the user understands that something is wrong. This delay in observing attainment of the maximum temperature $T_{max}$ also indicates that the measured rate of temperature increase was below the nominal range 56, and is indicative of a system error.

While the thermal runaway prevention system need not operate during the initial use period I since no heating occurs, it is again run during the operational period O to watch for feedback system errors. It can begin immediately with the start of the operational period O or after a brief initial delay (e.g., about ten to twenty seconds). Referring again to FIG. 10, as the system operates as described above to keep the roller temperatures maintained for operation, the thermal runaway prevention system again samples observed temperature profile data and compares it to a predetermined nominal range to make sure that system failures have not occurred. When the halogen bulbs 7 are turned on for heating (e.g., typically at about forty to fifty percent intensity in the operation phase O), an increase in temperature is expected over time. Line portion 60 represents the maximum rate of temperature increase that could occur. Line portion 64 represents the minimum acceptable rate of temperature increase (e.g., an increase of 1 degree Celsius over a 45 second period in which the halogen bulbs 7 are on for the illustrated machine). Due to circumstances like a high volume of thick pouches and media being laminated, the minimum acceptable rate of temperature increase can be substantially less than the maximum rate. The area between line portions 60 and 64 represents the nominal range 68 expected for heating during the operation period O.

If the processor 16 observes a rate of temperature increase lower than the nominal range 68, there is a system failure of one of the types already described above that is preventing the system from observing the expected nominal rate of temperature increase. The processor 16 will take corrective action along the same lines discussed above to prevent damage to the laminating machine. If the processor 16 observes a rate of temperature increase higher than the nominal range 68, then the feedback system will adjust accordingly to reduce the temperature increase into the nominal range 68 (e.g., by lowering the intensity of the halogen bulbs 7).

Figure 11:
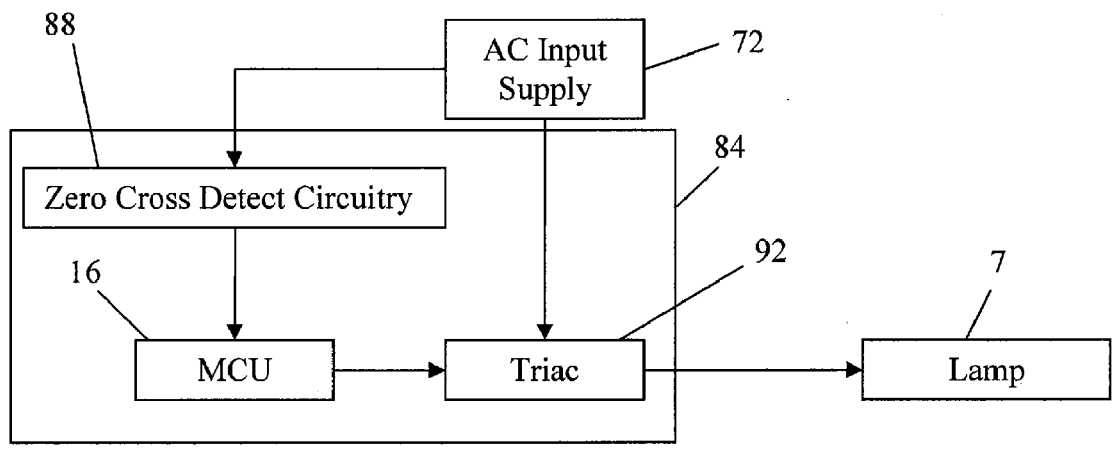
FIG. 11 is a schematic of the halogen lamp control system of the laminating machine.
Figure 12:
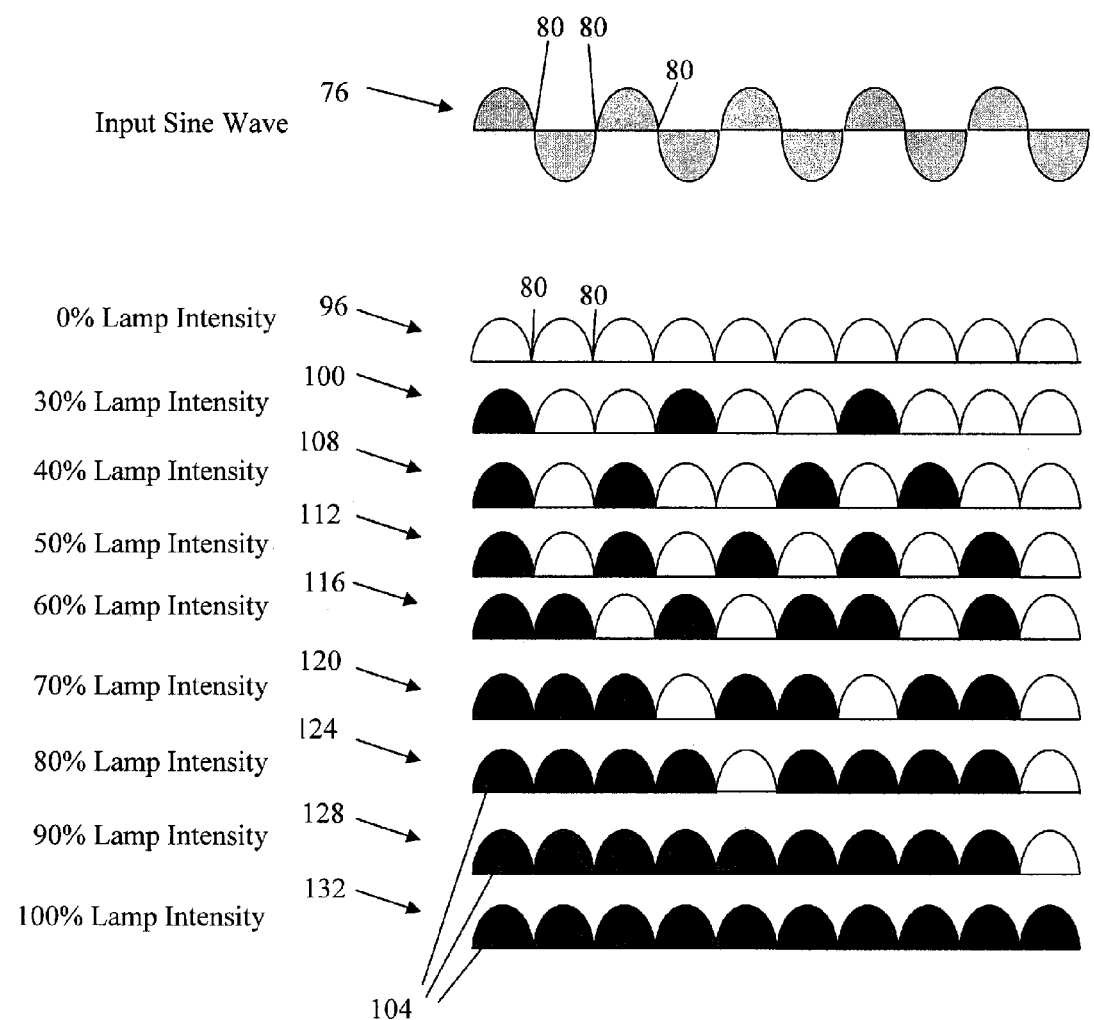
FIG. 12 illustrates an input sine wave corresponding to an AC power supply and a plurality of modulated lamp intensity waves illustrating how different intensities of a halogen lamp are achieved using a triode for alternating current.

The intensity control feature for the halogen bulbs 7 will now be described. As mentioned above, the laminating machine uses AC halogen bulbs 7 designed for use with an AC power supply. FIG. 11 schematically illustrates the system components involved in the intensity control feature. The AC input power supply is represented by block 72. FIG. 12 illustrates an input sine wave 76 representative of the AC power supply. Points 80 represent zero cross points of the sine wave 76. Referring again to FIG. 11, a printed circuit board (PCB) 84 has mounted thereon zero cross detect circuitry 88 for detecting zero cross occurrences 80 of the AC power supply sine wave 76. The zero cross detect circuitry 88 can include a set of diodes and communicates with the processor or microcontroller (MCU) 16 on the PCB 84 to alert the MCU 16 to zero cross occurrences. The MCU 16 communicates with a TRIAC 92 via a digital output on the PCB 84 to turn the TRIAC 92 on or off as desired. The TRIAC 92 acts as the gateway for providing AC power supply to the halogen bulbs or lamp 7. Therefore, together the MCU 16 and the TRIAC 92 control the intensity of the halogen lamp 7.

The TRIAC 92 is used because of its quick response time and the precise control it provides due to its inherent capability of maintaining the triggered output of power until the input supply voltage reaches a zero cross point 80. In other words, once the TRIAC 92 is triggered by the MCU 16, the output stays on until the input supply voltage 72 reaches a zero cross point 80. If, at this point, the TRIAC 92 has been turned off by the MCU 16, there is no further input supply voltage to the lamp 7. The next pulse of power is not supplied to the lamp 7 until the MCU 16 again turns on the TRIAC 92. The TRIAC 92 is useful in this regard for controlling the high-speed switching of the high loads associated with the intensity control of the halogen bulbs 7.

In the illustrated embodiment, primary lamp intensity is controlled by modulating the lamp 7 at a frequency that is twice the AC input frequency. A secondary lamp intensity modulation, which is a determination as to whether the primary modulation should be changed or maintained (i.e., a refresh rate), is performed at 1/10th of the primary modulation frequency, or after every 10 cycles. Of course, other primary and secondary modulation frequencies can be substituted. Table 1 below illustrates the modulation frequencies associated with both a 50 Hz AC input frequency and a 60 Hz AC input frequency.

TABLE 1

Modulation Frequency

| AC Input Frequency | Primary Lamp Control Modulation Frequency | Secondary Lamp Control Modulation Frequency |
|---|---|---|
| 50 Hz | 100 Hz | 10 Hz |
| 60 Hz | 120 Hz | 12 Hz |

Referring again to FIG. 12, waveform 96 illustrates the modulated TRIAC output (i.e., the primary modulation) associated with a zero percent lamp intensity. At zero percent intensity, the lamp 7 is off as indicated by the lack of any shaded waveform portions between zero cross points 80. Waveform 100 illustrates the modulated TRIAC output associated with a thirty percent lamp intensity or duty cycle. Three shaded waveform pulses 104 represent cycles in which the TRIAC 92 is turned on, and they occur in a substantially evenly-spaced or evenly-distributed manner over the ten cycles. The substantially even distribution of the pulses 104 reduces flicker in the lamp 7 and facilitates substantially even heating of the rollers 1,2 as they turn. Waveforms 108, 112, 116, 120, 124, 128, and 132 illustrate the modulated TRIAC output associated with forty percent, fifty percent, sixty percent, seventy percent, eighty percent, ninety percent, and one hundred percent lamp intensities, respectively (i.e., ten percent increments). Again, the shaded waveform pulses 104 represent cycles in which the TRIAC 92 is turned on, and they occur in a substantially evenly-spaced or evenly-distributed manner over the ten cycles.

Tables 2 and 3 below illustrate the TRIAC on/off time tables for a 50 Hz AC supply and for a 60 Hz AC supply, respectively. The MCU 16 turns the TRIAC 92 on (represented by a "1" in the appropriate box in Tables 2 and 3) in accordance with the desired lamp intensity that is graphically illustrated by the waveforms in FIG. 12. The TRIAC 92 is switched on as soon as a desired zero cross 80 is detected by the zero cross detect circuitry 88. The TRIAC 92 is switched off after a certain delay or trigger period that corresponds to the desired number of consecutive "on" cycles. The trigger period is specified in the last column of Tables 2 and 3. Entries having two trigger periods separated by a "/" are the two different trigger periods used for intensities that have "on" cycles of different lengths in a given ten cycle waveform. Recall that even when the TRIAC 92 is switched off, it allows the pulse of power to continue to the lamps 7 until the next zero cross point 80 is reached.

TABLE 2

Triac on/off time table for 50 Hz AC Supply

| 50 Hz | 1 | 2 | 3 | 4 | 5 | 6 | 7 | 8 | 9 | 10 | Trigger period (milliseconds) |
|---|---|---|---|---|---|---|---|---|---|---|---|
| Off  |   |   |   |   |   |   |   |   |   |   | — |
| 30%  | 1 |   |   | 1 |   |   | 1 |   |   |   | 5 |
| 40%  | 1 |   | 1 |   |   | 1 |   | 1 |   |   | 5 |
| 50%  | 1 |   | 1 |   | 1 |   | 1 |   | 1 |   | 5 |
| 60%  | 1 | 1 |   | 1 |   | 1 | 1 |   | 1 |   | 15/5 |
| 70%  | 1 | 1 | 1 |   | 1 | 1 |   | 1 | 1 |   | 25/15 |
| 80%  | 1 | 1 | 1 | 1 |   | 1 | 1 | 1 | 1 |   | 35 |
| 90%  | 1 | 1 | 1 | 1 | 1 | 1 | 1 | 1 | 1 |   | 85 |
| 100% | 1 | 1 | 1 | 1 | 1 | 1 | 1 | 1 | 1 | 1 |   |

TABLE 3

Triac on/off time table for 60 Hz AC Supply

| 60 Hz | 1 | 2 | 3 | 4 | 5 | 6 | 7 | 8 | 9 | 10 | Trigger period (milliseconds) |
|---|---|---|---|---|---|---|---|---|---|---|---|
| Off  |   |   |   |   |   |   |   |   |   |   | — |
| 30%  | 1 |   |   | 1 |   |   | 1 |   |   |   | 4.2 |
| 40%  | 1 |   | 1 |   |   | 1 |   | 1 |   |   | 4.2 |
| 50%  | 1 |   | 1 |   | 1 |   | 1 |   | 1 |   | 4.2 |
| 60%  | 1 | 1 |   | 1 |   | 1 | 1 |   |   | 1 | 12.5/4.2 |
| 70%  | 1 | 1 | 1 |   | 1 | 1 |   | 1 | 1 |   | 20.8/12.5 |
| 80%  | 1 | 1 | 1 | 1 |   | 1 | 1 | 1 | 1 |   | 29.2 |
| 90%  | 1 | 1 | 1 | 1 | 1 | 1 | 1 | 1 | 1 |   | 71.4 |
| 100% | 1 | 1 | 1 | 1 | 1 | 1 | 1 | 1 | 1 | 1 |   |

The above described intensity control feature utilizing the TRIAC 92 is different from other pulse width modulation schemes, which do not or cannot provide the control desired for the AC power supply. The intensity control of the present invention provides more stable temperature control over the entire rollers 1,2, thereby resulting in a high-quality laminated end-product.

In variations of the invention, the laminating machine may be included to warm up in a longer time period, for instance around one minute. In these embodiments, some of the measures described above may not be necessary. For instance, if the laminating device is configured to warm up in around one minute, it is anticipated that the "overshooting" of the temperature to a maximum temperature which is significantly above the operating temperature may not be necessary. Also, it is anticipated that it will not be necessary to place the halogen bulbs 7 so close to the rollers 1,2, and therefore the provision of fans 13 may be unnecessary.

It will be understood that embodiments of the present invention may provide laminating machines which warm up in a considerable shorter time than is presently practically possible.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

Various features and advantages of the invention are set forth in the following claims.

The invention claimed is:

1. A laminating arrangement system comprising:
   a laminating roller;
   a temperature detecting arrangement operable to detect a temperature of the laminating roller; and a processor operable to
- run a timer with a predetermined time period after which the laminating arrangement will timeout and shut down if no laminating has been done,
- receive a signal from the temperature detecting arrangement indicative of the temperature of the laminating roller,
- determine a temperature drop of the laminating roller,
- compare the temperature drop of the laminating roller to a predetermined temperature drop, and
- reset the timer if the temperature drop of the laminating roller is equal to or greater than the predetermined temperature drop, indicating that laminating has been done.

2. The laminating arrangement system of claim 1, wherein the temperature drop of the laminating roller is determined as a rate of temperature drop and the predetermined temperature drop is a predetermined rate of temperature drop.

3. The laminating arrangement system of claim 2, wherein the predetermined rate of temperature drop is at least 0.7 degrees Celsius per second.

4. The laminating arrangement system of claim 1, wherein no switch or sensor is provided on the laminating arrangement system for detecting an insertion of laminating medium into the laminating arrangement.

5. A laminating arrangement system comprising:
- a laminating roller;
- a heat source for heating the laminating roller;
- a temperature detecting arrangement operable to detect a temperature of the laminating roller; and
- a processor operable to
  - receive a signal from the temperature detecting arrangement indicative of the temperature of the laminating roller,
  - determine a rate of temperature increase of the laminating roller based on the signal from the temperature detecting arrangement,
  - compare the determined rate of temperature increase to a nominal rate of temperature increase expected for the laminating roller, and
  - if the determined rate is below the nominal rate, take action to prevent damage to the laminating arrangement caused by excessive heating of the laminating roller.

6. The laminating arrangement system of claim 5, wherein taking action to prevent damage to the laminating arrangement includes turning off the heat source.

7. The laminating arrangement system of claim 5, wherein taking action to prevent damage to the laminating arrangement includes turning on a fan.

8. The laminating arrangement system of claim 5, wherein taking action to prevent damage to the laminating arrangement includes activating at least one of a visual and an audio indicator for a user.

9. The laminating arrangement system of claim 5, wherein the nominal rate of temperature increase expected for the laminating roller is for a warm-up period of the laminating arrangement.

10. The laminating arrangement system of claim 5, wherein the nominal rate of temperature increase expected for the laminating roller is for an operation period of the laminating arrangement.

11. A laminating arrangement comprising:
- a laminating roller;
- a heat source for heating the laminating roller, the heat source being powered by an AC power supply; and
- a heat source intensity control system for controlling the intensity of the heat source, the intensity control system including
  - a processor, and
  - a triode for alternating current communicating with the processor, the triode for alternating current being turned on and off by the processor to control the AC power supply to the heat source to vary the intensity of the heat source.

12. The laminating arrangement of claim 11, wherein the heat source intensity control system further comprises zero cross detect circuitry for detecting a zero cross point of the AC power supply, the processor communicating with the zero cross detect circuitry.

13. The laminating arrangement of claim 11, wherein the heat source is a halogen bulb.

14. The laminating arrangement of claim 11, wherein the heat source intensity control system is operable to vary the intensity of the heat source from thirty percent intensity to one hundred percent intensity at ten percent increments.

15. The laminating arrangement of claim 11, wherein the processor turns the triode for alternating current on and off in a substantially evenly-distributed manner over a period of cycles of the AC power supply to achieve substantially even heating of the laminating roller.

* * * * *